United States Patent
Zhou et al.

(10) Patent No.: US 12,166,895 B2
(45) Date of Patent: Dec. 10, 2024

(54) METHOD, APPARATUS, ELECTRONIC DEVICE, AND MEDIUM FOR DATA TRANSFER

(71) Applicant: DELL PRODUCTS L.P., Round Rock, TX (US)

(72) Inventors: Yizhou Zhou, Chengdu (CN); Tao Qing, Chengdu (CN); Yu Yan, Chengdu (CN)

(73) Assignee: DELL PRODUCTS L.P., Round Rock, TX (US)

( * ) Notice: Subject to any disclaimer, the term of this patent is extended or adjusted under 35 U.S.C. 154(b) by 322 days.

(21) Appl. No.: 17/679,969

(22) Filed: Feb. 24, 2022

(65) Prior Publication Data

US 2023/0231719 A1 Jul. 20, 2023

(30) Foreign Application Priority Data

Jan. 20, 2022 (CN) .......................... 202210068419.5

(51) Int. Cl.
*H04L 9/32* (2006.01)
*H04L 9/00* (2022.01)

(52) U.S. Cl.
CPC .......... *H04L 9/3239* (2013.01); *H04L 9/3247* (2013.01); *H04L 9/3268* (2013.01); *H04L 9/50* (2022.05)

(58) Field of Classification Search
CPC .... H04L 9/3239; H04L 9/3247; H04L 9/3268
See application file for complete search history.

(56) References Cited

U.S. PATENT DOCUMENTS

| | | | |
|---|---|---|---|
| 10,102,526 B1* | 10/2018 | Madisetti | G06Q 20/389 |
| 2018/0349896 A1* | 12/2018 | Arora | G06Q 20/3829 |
| 2019/0334700 A1* | 10/2019 | Callan | H04L 9/083 |
| 2020/0145192 A1* | 5/2020 | Elkhiyaoui | H04L 9/0869 |
| 2020/0160466 A1* | 5/2020 | Hori | G06F 16/27 |
| 2020/0204350 A1* | 6/2020 | Kramer | H04L 9/0643 |
| 2021/0056630 A1* | 2/2021 | Rechtschaffen | H04L 9/3239 |
| 2022/0058610 A1* | 2/2022 | Bedford | G06Q 20/065 |

* cited by examiner

*Primary Examiner* — William S Powers
(74) *Attorney, Agent, or Firm* — WOMBLE BOND DICKINSON (US) LLP

(57) ABSTRACT

Embodiments of the present disclosure relate to a method, an apparatus, an electronic device, and a medium for data transfer. The method includes generating, based on metadata of to-be-transferred data and a blockchain including a data transfer record, an ownership certificate of an initiator of a transfer for the to-be-transferred data. The method further includes generating a new transfer record for validation by a blockchain system, where the new transfer record includes the ownership certificate and validation information associated with a receiver of the transfer. The method further includes transferring the to-be-transferred data to the receiver in response to that the new transfer record passes validation of the blockchain system. In this way, the data transfer record may be reliably stored in the blockchain, thereby providing reliable integrity protection and data traceability for a storage system.

20 Claims, 6 Drawing Sheets

METHOD, APPARATUS, ELECTRONIC DEVICE, AND MEDIUM FOR DATA TRANSFER

CROSS-REFERENCE TO RELATED APPLICATION

This patent application claims priority, under 35 U.S.C. § 119, of Chinese Patent Application No. 202210068419.5, filed Jan. 20, 2022, which is incorporated by reference in its entirety.

TECHNICAL FIELD

Embodiments of the present disclosure relate to the field of computer storage technologies. Embodiments of the present disclosure provide a method, an apparatus, an electronic device, a medium, and a computer program product for data transfer.

BACKGROUND

With development of modern information technologies, data in a storage system, especially a distributed storage system, often needs to move between different locations according to service requirements, which is also called data transfer. A range of data transfer may be small, for example, in the same lab, or transfer on a large scale, for example, between different global locations.

There is a risk of issues/errors after data transfer, e.g., data corruption or loss. Once such problems occur, the transferred data will become inaccessible. Therefore, data integrity protection during the entire data transfer process is very important. In addition, customers often need to track the data transfer process to find out if data has been modified or a transfer path has changed. Therefore, the credibility and traceability of data transfer is also important.

SUMMARY OF THE INVENTION

According to a first aspect of the present disclosure, a method for data transfer is provided. The method includes generating, based on metadata of to-be-transferred data and a blockchain including a data transfer record, an ownership certificate of an initiator of a transfer for the to-be-transferred data. The method further includes generating a new transfer record for validation by a blockchain system, where the new transfer record includes the ownership certificate and validation information associated with a receiver of the transfer. The method further includes transferring the to-be-transferred data to the receiver in response to that the new transfer record passes validation of the blockchain system.

According to a second aspect of the present disclosure, an apparatus for data transfer is further provided. The apparatus includes an ownership certificate generation unit, a transfer record generation unit, and a data transfer unit. The ownership certificate generation unit is configured to generate, based on metadata of to-be-transferred data and a blockchain including a data transfer record, an ownership certificate of an initiator of a transfer for the to-be-transferred data. The transfer record generation unit is configured to generate a new transfer record for validation by a blockchain system, where the new transfer record includes the ownership certificate and validation information associated with a receiver of the transfer. The data transfer unit is configured to transfer the to-be-transferred data to the receiver in response to that the new transfer record passes validation of the blockchain system.

According to a third aspect of the present disclosure, an electronic device is provided. The electronic device includes at least one processing unit and at least one memory. The at least one memory is coupled to the at least one processing unit and stores an instruction executed by the at least one processing unit, and the instruction, when executed by the at least one processing unit, enables the electronic device to execute the method according to the first aspect of the present disclosure.

According to a fourth aspect of the present disclosure, a computer readable storage medium is provided. The computer readable storage medium includes a machine executable instruction, and the machine executable instruction, when executed by a device, enables the device to execute the method according to the first aspect of the present disclosure.

According to a fifth aspect of the present disclosure, a computer program product is provided. The computer program product is tangibly stored on a computer readable medium and includes a machine executable instruction, and the machine executable instruction, when executed by a device, enables the device to execute the method according to the first aspect of the present disclosure.

BRIEF DESCRIPTION OF THE DRAWINGS

The above and other features, advantages and aspects of various embodiments of the present disclosure will become more apparent when taken in combination with the accompanying drawings and with reference to the following detailed description. In the drawings, the same or similar reference numbers refer to the same or similar elements, in which.

DETAILED DESCRIPTION

Embodiments of the present disclosure are described in more detail with reference to the accompany drawings below. Although some embodiments of the present disclosure are shown in the accompany drawings, it should be understood that the present disclosure may be realized in various forms and should not be explained as being limited to embodiments described herein. Instead, these embodiments are provided to enable a more thorough and complete understanding of the present disclosure. It should be understood that the accompany drawings and embodiments of the present disclosure are only for exemplary purpose, and not to limit the protection scope of the present disclosure.

In the description of the embodiments of the present disclosure, the term "include" and similar terms should be understood as open-ended inclusion, that is, "include but not limited to." The term "based on" should be understood as "at least partially based on." The terms "an embodiment" and "the embodiment" should be understood as "at least one embodiment." The terms "first," "second," and the like may refer to different or identical objects. Other explicit and implicit definitions may also be included below.

In addition, all specific numerical values herein are examples provided only to aid understanding, and are in no way intended to limit the range.

As stated above, data in a storage system may be damaged or lost during a transfer process, making the transferred data unusable. On the other hand, data may be maliciously modified or a transfer path may be changed during the transfer process, making the transferred data incredible. Therefore, an effective solution is needed to provide reliable integrity protection and traceability for data transfer.

According to embodiments of the present disclosure, the blockchain technology is introduced into the data transfer process. The blockchain is inherently immutable and traceable. These advantages of the blockchain can be used to provide customers with more reliable storage services.

According to an embodiment of the present disclosure, a solution for data transfer is provided. According to the solution, records of completed data transfers are stored in a blockchain. When data transfer needs to be performed, an initiator of a transfer generates, based on metadata of to-be-transferred data and a blockchain, an ownership certificate of the initiator owning the to-be-transferred data. Then a new transfer record is generated by using the ownership certificate and validation information from a receiver who will receive the data. If the new transfer record passes validation of a blockchain system, data transfer to the receiver may be completed. In this way, the data transfer record may be reliably stored in the blockchain, thereby providing reliable integrity protection and traceability for data transfer.

Some exemplary embodiments of the present disclosure are described below with reference to the accompany drawings.

Figure 1:
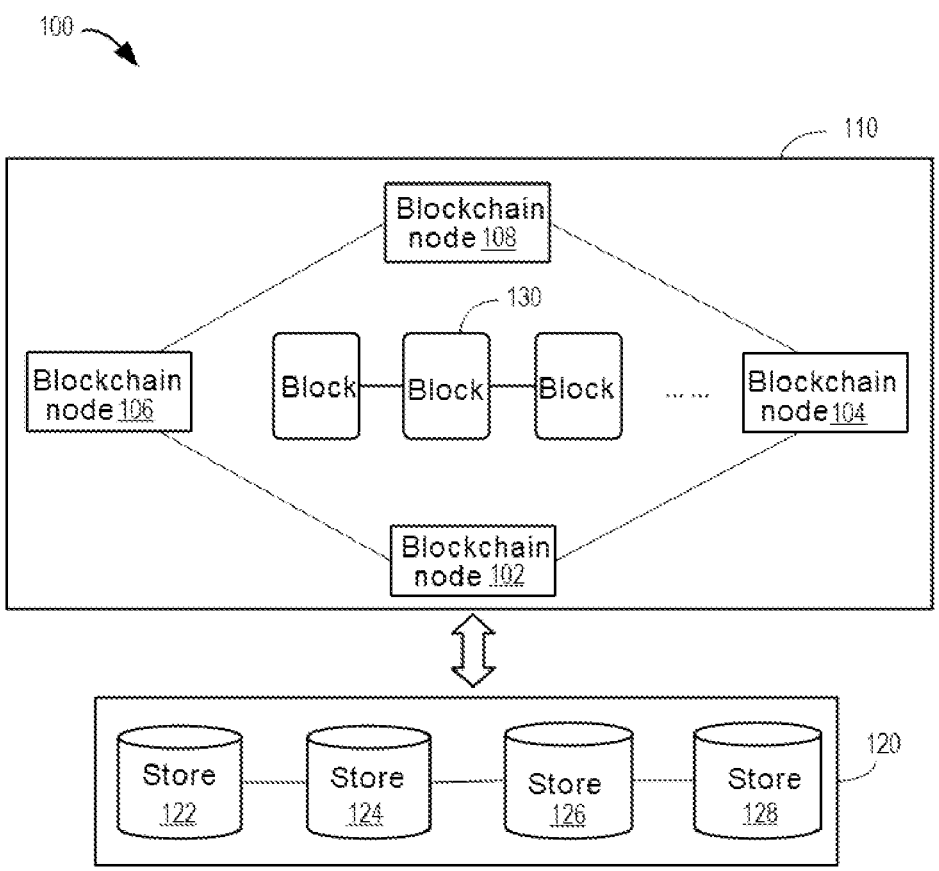
FIG. 1 is a block diagram of an exemplary environment according to some embodiments of the present disclosure.

FIG. 1 is a block diagram of exemplary environment 100 according to some embodiments of the present disclosure. Environment 100 includes blockchain system 110 and storage system 120. Blockchain system 110 may also be referred to as a distributed ledger system or a consensus network in which nodes or clients are able to securely and immutably conduct application affairs (also known as "transactions") and store affair data in the form of a blockchain. Although a blockchain network is often associated with a specific network, as used herein, a blockchain network generally refers to an implementation of a distributed ledger system rather than any specific network.

As shown in the figure, blockchain system 110 includes blockchain nodes 102 to 108. For ease of description, FIG. 1 only shows four blockchain nodes, but it may be understood that environment 100 may have more blockchain nodes. In some embodiments, exemplary blockchain nodes 102 to 108 may be electronic devices or computer programs running on electronic devices. The electronic device may be a computing-enabled device such as a personal computer, a workstation, a server, or the like. The scope of the present disclosure is not limited in this regard. Blockchain nodes 102 to 108 may be interconnected via any suitable network (for example, a wired network, a wireless local area network, the Internet, a cellular network, etc.).

Blockchain nodes 102 to 108 may execute a smart contract. The smart contract is a program executed in blockchain system 110 and includes a group of predefined rules. Blockchain nodes 102 to 108 may complete application affairs via the smart contract. For example, the smart contract may determine, according to a received input, whether to execute corresponding actions. Transaction data (such as a data transfer record to be validated) is generated during execution of a smart contract. The transaction data may be broadcast to other blockchain nodes in blockchain system 110. In a consensus mechanism, the transaction data passes validation and is used to generate blocks, and multiple blocks may be combined to form blockchain 130 stored in blockchain system 110 in a distributed way.

Blockchain 130 is a data structure and stores transaction data submitted by blockchain nodes 102 to 108 of blockchain system 110 into blockchain system 110 in an immutable way. Therefore, data transfer records recorded in blockchain 130 are reliable and credible.

As shown in FIG. 1, environment 100 further includes storage system 120. Storage system 120 includes storage apparatuses 122 to 128 connected via a network. To facilitate description, FIG. 1 only shows four storage apparatuses. However, it can be understood that storage apparatus 120 may include more storage apparatuses. Storage apparatuses 122 to 128 may, for example, include a storage cluster including a disk array or a single storage device. Storage apparatuses 122 to 128 may be deployed on the same site or spatially separated from each other. The scope of the present disclosure is not limited in this regard.

In some embodiments, data in storage system 120 may be physically transferred between storage apparatuses 122 to 128; that is, storage locations of data change. In this case, a storage apparatus storing the data or a part of the storage apparatus possesses an ownership of the data. In some embodiments, data in storage system 120 may be logically transferred. For example, an ownership of the data is changed from a user using storage system 120 to another user. As used herein, an ownership of data includes the above-described physical or logical ownership, and correspondingly, a data owner may be one of storage apparatuses 122 to 128 of storage system 120 or a user using storage system 120. Solutions of the present disclosure as described below use a physical transfer of data as an example; however, it should be understood that the scope of the present disclosure is not limited in this regard.

According to embodiments of the present disclosure, blockchain system 110 is used to provide data integrity protection and traceability for storage system 120. In some embodiments, storage apparatuses 122 to 128 may be registered to blockchain system 110 via blockchain nodes 122 to 128 to obtain corresponding public keys and private keys. In some embodiments, a public key may be used as an identifier of a storage apparatus or a part of a storage apparatus having a data ownership. A public key and a private key may be used to prove an ownership of data and a permission of transferring the data from a storage location to another storage location. As used herein, blockchain 130 is sometimes referred to as a data protection blockchain.

It should be understood that the environment shown in FIG. 1 for implementing embodiments of the present disclosure is merely exemplary, and the embodiments of the present disclosure may be implemented in different environments.

As used herein, data is divided into two parts: raw data and metadata. The raw data refers to data that is stored in storage system 120 and that can be transferred. The metadata is used to uniquely identify the raw data. Metadata may be generated in various ways. For example, the metadata may be a hash value of raw data, a combination of attributes obtained from the raw data, or a combination of both. According to an embodiment of the present disclosure, metadata may be stored in blockchain 130 as a part of a data transfer record. Since data in blockchain 130 is immutable, integrity protection for raw data can be provided. For example, once the raw data is changed, the metadata thereof is changed. When the metadata cannot be validated in blockchain 130, it can be considered that the data is changed or damaged after transferring, and an alarm can be sent.

Besides integrity protection, according to a solution of an embodiment of the present disclosure, an ownership certificate of raw data is provided via metadata. The ownership certificate is used to indicate who owns the metadata, that is, who owns the raw data. In various application scenarios, an ownership data is critical, for example, a requester for accessing data is required to have ownership certification. According to an embodiment of the present disclosure, a data transfer not only includes a transfer of raw data, that is, moving from one storage location to another storage location, but also includes a transfer of metadata on blockchain 130. Description is made with reference to FIGS. 2A and 2B.

Figure 2A:
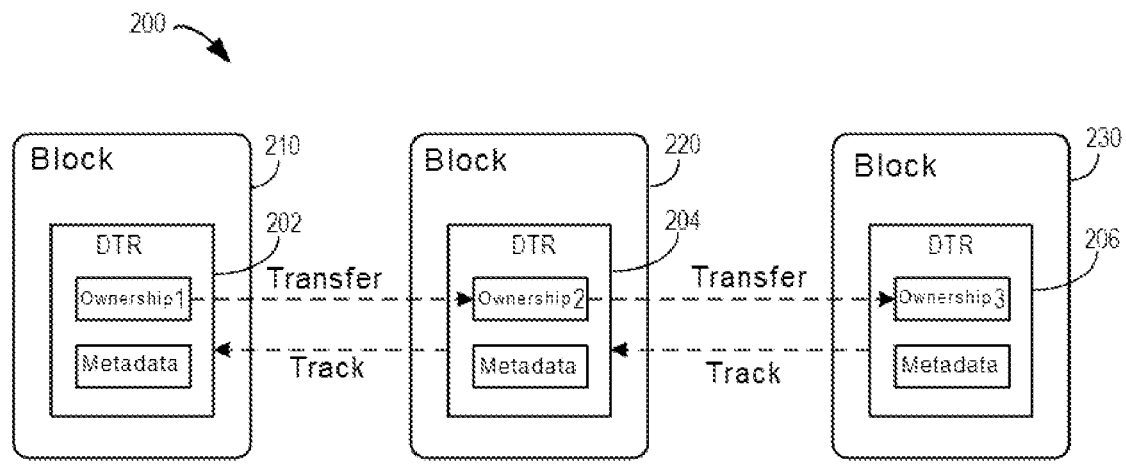
FIG. 2A is a schematic diagram of a blockchain for data transfer according to some embodiments of the present disclosure.

FIG. 2A is a schematic diagram of a blockchain for data transfer according to some embodiments of the present disclosure. Blockchain 200 includes multiple blocks 210, 220, and 230 storing the same metadata.

As shown in the figure, block 210 includes Data Transfer Record (DTR) 202, where data transfer record 202 includes metadata and corresponding ownership 1. Ownership 1 may indicate a location where raw data corresponding to the metadata can be stored after the data transfer record is stored into blockchain 200, for example, a certain storage apparatus in storage system 120.

In some embodiments, an initiator of a data transfer may generate a to-be-validated transfer record by using a blockchain node (such as blockchain node 102), and send the transfer record to other nodes in blockchain system 110 for validation. In some embodiments, a data transfer record may include scripts that can be executed by other blockchain nodes so as to facilitate validating the transfer record. Once the transfer record passes validation, the transfer record can be stored into block 210 so as to be stored in blockchain system 110 in a distributed way. This process is also called chaining. In addition, when the transfer record passes validation, blockchain node 102 may obtain a receipt as a result of the data transfer. The receipt may include information such as an execution result indicating whether the transfer succeeds, a hash value of a data transfer task, a hash of a block where the transfer record is located, the number of a block where the transfer record is located, an index of a block where the transfer record is located, and the like. Those skilled in the art should understand that a receipt may include more or less information depending on a specific implementation of a blockchain network. When it is determined according to the receipt that a data transfer passes validation, a transfer of corresponding raw data is permitted, and the raw data may be transferred to a receiver indicated by the data transfer record.

Then, when a next transfer about the metadata occurs (that is, the raw data will be transferred), blockchain node 202 or other blockchain nodes in blockchain system 110 generate a to-be-validated transfer record. At this time, the transfer record is validated by using ownership 1 in data transfer record 202 of block 210. If the validation passes, data can be further transferred, transfer record 204 can be stored to block 220, and the transfer of corresponding raw data can be completed. In the similar way, data transfer record 206 can be generated, chained, and stored to block 230, thereby realizing change from ownership 2 to ownership 3 and completing the transfer of corresponding raw data.

In addition, tracking of metadata may be realized by means of the blockchain shown in FIG. 2A. In some embodiments, a historical transfer record of desired metadata can be found in blockchain 200 by using a searching method such as Bloom filter. It should be understood that there is a corresponding relationship between metadata and raw data, and a transfer path of raw data can also be determined accordingly.

It should be noted that blocks 210, 220, and 230 shown in FIG. 2A seem to be adjacent to each other, but blocks actually storing transfer records of the same metadata are not necessarily adjacent blocks in blockchain 200. In fact, blocks in blockchain system 110 may be generated periodically, for example, a new block is generated every 10 minutes. However, the time of a data transfer may depend on service requirements and is not periodic. Therefore, in blockchain 200, blocks storing transfer records of the same metadata may be separate.

Figure 2B:
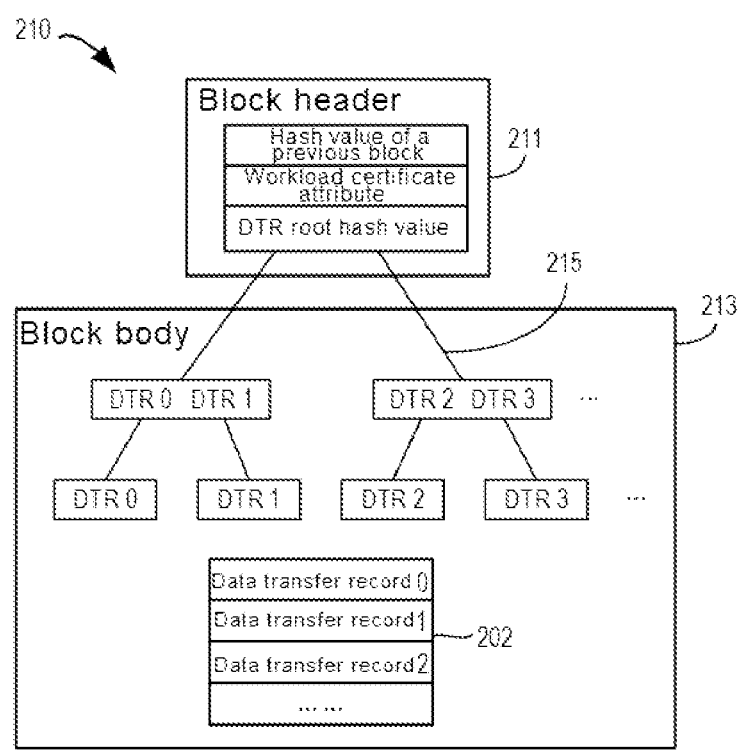
FIG. 2B is a schematic diagram of a layout of a block including a data transfer record according to some embodiments of the present disclosure.

FIG. 2B is a schematic diagram of a layout of a block including a data transfer record according to some embodiments of the present disclosure. Description is made by using block 210 as an example, and it should be understood that other blocks are similar.

Block 210 includes block header 211 and block body 213. Block header 211 includes a hash value of a previous block, a workload certificate attribute, and a root hash value of a data transfer record. In some embodiments, block header 211 may further include information such as a hash value of its own block body, a random number, and a time stamp.

Block body 213 includes data transfer record 202 validated by multiple blockchain nodes of blockchain system 110 over a period of time and other data transfer records. Hash value calculation is performed on data transfer record 202, which is encoded into Merkle tree 215. Herein, examples of hash functions that calculate hash values include, but are not limited to, for example, secure Hash algorithm (SHA)-256, which outputs a fixed-length 256-bit hash value. As shown in FIG. 2B, Merkle tree 215 includes leaf nodes DTR 0, DTR 1, DTR 2, DTR 4, and so on. They represent hash values of corresponding data transfer records. Then, according to two adjacent hash values, a hash layer of a previous layer is further calculated, and so on, until a root hash value of Merkle tree 215 is calculated.

The DTR root hash value is stored in block header 211. Therefore, the root hash value represents hash values of all data transfer records stored in block body 204. Each block is linked to a previous block by storing a hash value of the previous block in its own block header before entering the chain. After a block is generated, it is broadcast to entire blockchain network 110 and stored by each blockchain node. If any data transfer record in block 210 is changed, it means that its hash value also changes, causing the DTR root Hash value in block header 211 to also change. By means of this mechanism, integrity protection for transfer records can be provided.

Figure 3:
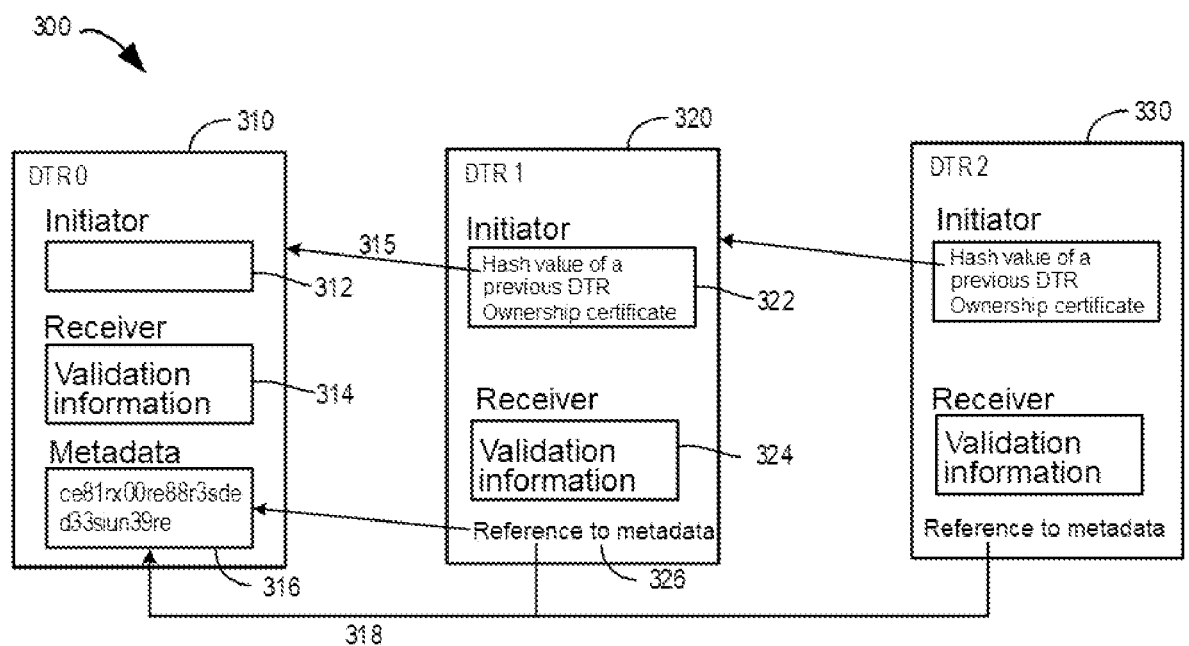
FIG. 3 shows an exemplary layout of a data transfer record in a blockchain according to some embodiments of the present disclosure.

To facilitate understanding, a layout of data transfer records according to an embodiment of the present disclosure is described first. FIG. 3 shows exemplary layout 300 of data transfer records in a blockchain. The multiple data transfer records involve transfer of the same raw data, so the metadata included therein are the same.

A data transfer record includes necessary information for a data transfer process, which generally includes an initiator area, a receiver area, and a metadata area (or a metadata reference). The initiator area indicates a party that initiates the data transfer and can include a hash value that points to or links to a previous data transfer record and an ownership certificate before this data transfer.

In FIG. 3, data transfer record 310 is the first transfer record regarding the data transfer of the raw data, which is also referred to as a base transfer record. Initiator area 312 of data transfer record 310 may be empty, and receiver area 314 may include validation information associated with a storage location where the raw data is generated. Metadata area 316 records metadata of the raw data, for example, a hash value generated according to the raw data or other unique identifiers.

Data transfer record 320 is a next transfer record for data transfer of the raw data. Initiator area 322 of data transfer record 320 includes a hash value of a previous data transfer record, as shown by arrow 315 in the figure. By means of the hash value, data transfer records about the same raw data or metadata can be linked together to form a data transfer chain, so that a path of data transfer can be tracked. Initiator area 322 further includes an ownership certificate, and the ownership certificate may be based on a current storage location of the raw data and associated with validation information 314 in the receiver area in the previous transfer record. By means of the association, before data transfer record 320 is added to a blockchain, its legitimacy can be validated by blockchain system 110, for example, whether an initiator of the data transfer actually possesses an ownership of the raw data or metadata. Receiver area 324 includes validation information of a receiver of this data transfer. In some embodiments, validation information may be provided by a receiver, and the validation information may be, for example, a hash value for signature information and other information. Metadata area 326 may include a reference to the metadata, as shown by arrow 318 in the figure. The size of an entire blockchain may be reduced by means of reference.

Similarly, data transfer record 330 is a further next transfer record about a data transfer of the raw data. Content of data transfer record 330 is similar to that of data transfer record 320, which is not described herein again.

Figure 4:
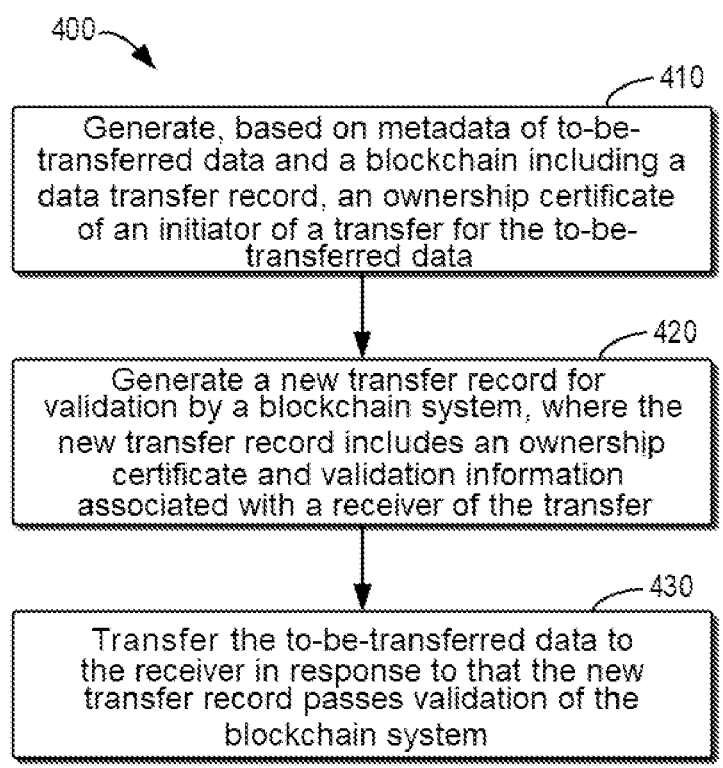
FIG. 4 is a schematic flow chart of a method for data transfer according to some embodiments of the present disclosure.

FIG. 4 is a schematic flow chart of method 400 for data transfer according to some embodiments of the present disclosure. Method 400 may be performed by one or more blockchain nodes in blockchain system 110 as shown in FIG. 1 or an electronic device running blockchain nodes. Method 400 may be performed as triggered by the initiator of the transfer.

In block 410, a blockchain node generates, based on metadata of to-be-transferred data and a blockchain including a data transfer record, an ownership certificate of an initiator of a transfer for the to-be-transferred data. As described above with reference to FIG. 3, the ownership certificate may be filled in an initiator area of the data transfer record.

In some embodiments, a blockchain node queries a previous transfer record of to-be-transferred data from blockchain 130 of blockchain system 110 by using the metadata. Specifically, a blockchain node may generate metadata from raw data according to a predetermined metadata generation rule. Alternatively, the metadata may have been generated during the last transfer to a receiver (i.e., the current initiator), so that the blockchain node can directly obtain the stored metadata. The blockchain node can look up a transfer record in the blockchain by means of a Bloom filter.

If a data transfer record cannot be found using the metadata, it indicates that the raw data or metadata may have been damaged or lost, and the data transfer cannot be continued. If data transfer records are found, the last record in all the transfer records found is the previous transfer record. The blockchain node may generate the ownership certificate based on validation information associated with the receiver of the transfer in the previous transfer record and signature information of the initiator. Further explanation is given with reference to FIG. 5.

Figure 5:
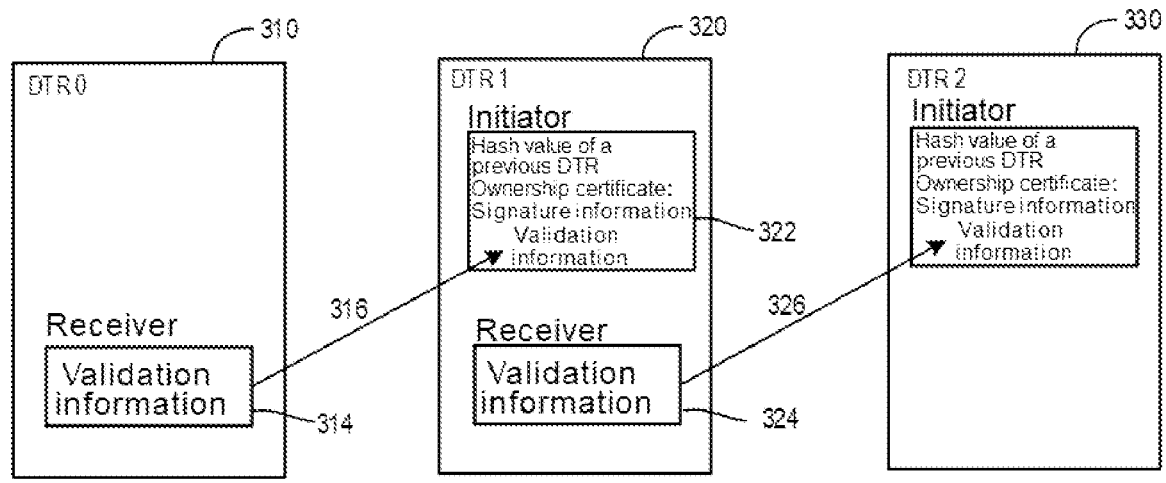
FIG. 5 is a schematic diagram of a layout of an ownership certificate in a blockchain according to an embodiment of the present disclosure.

FIG. 5 shows a layout of an ownership certificate in a blockchain according to an embodiment of the present disclosure. As shown in FIG. 5, validation information comes from receiver areas 314 and 324 stored in a previous transfer record, as shown by arrows 316 and 326. It should be noted that the validation information in receiver areas 314 and 324 of the previous transfer record is provided by the initiator of the current transfer during the previous transfer. By means of the association, the ownership certificate in the new transfer record can be used to validate legitimacy of the data transfer, that is, whether the initiator of the transfer actually possesses an ownership of raw data and metadata.

In some embodiments, an ownership certificate may be implemented as a stack-based executable script. The executable script may be executed by a blockchain node in blockchain system 110 to validate a corresponding transfer record. In some embodiments, ownership certificate may include an ownership script (OwnershipScript) and an ownership hash script (OwnershipHashScript) for validating an identify of an initiator of a transfer. In some embodiments, the ownership script may include signature information, and the ownership hash script may include validation information described above. The content of the ownership certificate is schematically described below.

<OwnershipScript><OwnershipHashScript> (1)
OwnershipScript: <signature><ValidationScript> (2)
ValidationScript: <pubkey> [DPOP_VERIFYSIG] (3)
OwnershipHashScript: [DPOP_HASH]<ValidationScriptHash> [DPOP_EQ] (4)

According to (1), the ownership certificate includes an ownership script and an OwnershipHashScript. According to (2), the ownership script includes signature information (<signature>) and a validation script (<ValidationScript>) obtained by encrypting with a private key of an initiator of the transfer. According to (3), the validation script includes a public key (<pubkey>) of the initiator and an instruction ([DPOP_VERIFYSIG]) to perform a signature validation operation. According to (4), the ownership hash script sequentially includes an instruction ([DPOP_HASH]) to calculate a hash value, validation information (<ValidationScriptHash>) from a receiver area of a previous transfer record, and an instruction ([DPOP_EQ]) to validate whether the instruction [DPOP_HASH] that calculates the Hash value according to the above is equal to the verification information <ValidationScriptHash>. The code in the above pseudo-code ownership certificate can be stored in a stack, which is also called pushing. That is, an ownership certificate is generated by sequentially pushing [DPOP_EQ], <ValidationScriptHash>, [DPOP_HASH], [DPOP_VERIFYSIG], <pubkey>, and <signature>.

Further with reference to FIG. 4, at block 420, a blockchain node generates a new transfer record for validation by a blockchain system, where the new transfer record includes an ownership certificate and validation information associated with a receiver of the transfer.

As stated above, when the ownership certificate is generated, the verification information associated with the receiver of the transfer in the previous transfer record can be obtained. The validation information may include a hash value generated by an initiator of the current transfer for its signature information. The validation information is actually generated and stored during the previous data transfer and is used for validation of the current data transfer. Therefore, the verification information from the receiver of the current transfer also needs to be obtained for the new transfer record. Similarly, the verification information can be obtained by calculating the hash value of an ownership script of the receiver.

In some embodiments, a generated new transfer record may be sent to a blockchain node in blockchain system 110 for validation, referring to the ownership certificate including the ownership script and the ownership hash script described above. The block node in blockchain system 110 may sequentially obtain <signature>, <pubkey>, [DPOP_VERIFYSIG], [DPOP_HASH], <ValidationScriptHash>, and [DPOP_EQ] from the ownership certificate by popping. The blockchain node may use the public key <pubkey> of the initiator to validate the <signature> according to the signature validation instruction [DPOP_VERIFYSIG] to confirm the authenticity of the identity of the initiator of the transfer, then calculate a hash value of the ownership script (including <signature>, <pubkey>, and [DPOP_VERIFYSIG]) according to the [DPOP_HASH], and validate, according to the instruction [DPOP_EQ], whether the calculated hash value is equal to the hash value <ValidationScriptHash> in the ownership certificate. If yes, the new transfer record passes the validation. Since <ValidationScriptHash> is the validation information provided by the receiver of the last transfer (also the initiator of the current transfer), the hash value generated based on the ownership script of the current initiator should be the same as the validation information. Therefore, by means of the association, a reliable ownership validation mechanism is achieved.

In some embodiments, a hash value of the previous transfer record of current to-be-transferred data in a blockchain may be generated, and the hash value is stored in a new transfer record, as shown by arrow 315 in FIG. 3. By means of the hash value, data transfer records about the same raw data or metadata can be linked together to form a data transfer chain, and a path of data transfer can be tracked.

In some embodiments, metadata of to-be-transferred data or a reference to the metadata may be stored in a new transfer record. The metadata or reference in the transfer record is used to indicate which metadata or raw data the new transfer record is for.

Subsequently, at block 430, in response to that a new transfer record passes validation of a blockchain system, to-be-transferred data is transferred to a receiver. In some embodiments, the generated new transfer record may be sent to a blockchain node in blockchain system 110. The blockchain node validates the new transfer record, for example, validates by executing an ownership certificate in the transfer record. By means of a consensus mechanism provided by blockchain system 110, blockchain system 110 may summarize execution results of the blockchain node, and provide an initiator of the transfer with validation results about the transfer record. If the validation results indicate that the new transfer record passes the validation, the to-be-transferred data is permitted to be transferred from the initiator to the receiver.

In some embodiments, if a new transfer record passes validation of blockchain system 110, the new transfer record can be stored in a blockchain, that is, chaining.

It can be seen by combing descriptions of FIGS. 1 to 5 that in the embodiments of the present disclosure, data transfer only needs to focus on how to move raw data from one place to another and storing metadata in a blockchain without additionally worrying about a data integrity protection process. Even if the raw data is destroyed by an attacker, due to the immutable metadata in the data protection blockchain, an alarm can be instantly sent once data integrity is destroyed. In addition, by means of a blockchain technology, the history of a data transfer record is stored immutably without any additional storage and policies, and is easily retrieved on demand, thereby enabling easy tracking of a data transfer path. Compared with a conventional storage system, no heavyweight management entity is required in the storage system employing the technology of the present disclosure, because part of the information and protection has already been borne by the blockchain. It reduces the complexity of the system and a data movement process, while bringing a more secure and simpler mechanism for data storage.

Figure 6:
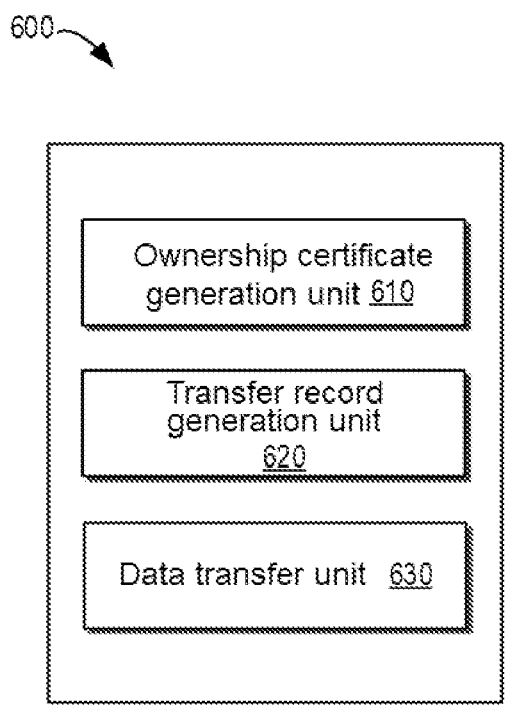
FIG. 6 is a schematic block diagram of an apparatus for data transfer according to some embodiments of the present disclosure.

FIG. 6 is a schematic block diagram of apparatus 600 for managing documents according to some embodiments of the present disclosure. Apparatus 600 includes ownership certificate generation unit 610, transfer record generation unit 620, and data transfer unit 630. Apparatus 600 may be implemented in one or more blockchain nodes in blockchain system 110 as shown in FIG. 1 or in an electronic device running a blockchain node.

Ownership certificate generation unit 610 is configured to generate, based on metadata of to-be-transferred data and a blockchain including a data transfer record, an ownership certificate of an initiator of a transfer for the to-be-transferred data.

Transfer record generation unit 620 is configured to generate a new transfer record for validation by a blockchain system, where the new transfer record includes the ownership certificate and validation information associated with a receiver of the transfer.

Data transfer unit 630 is configured to transfer the to-be-transferred data to the receiver in response to that the new transfer record passes validation of the blockchain system.

In some embodiments, ownership certificate generation unit 610 is further configured to search for a previous transfer record of the to-be-transferred data from the blockchain by using the metadata; and generate the ownership certificate based on validation information associated with the receiver of the transfer in the record of previous transfer and signature information of the initiator. In some embodiments, the validation information associated with the receiver of the transfer in the previous transfer record includes a hash value generated for the signature information by the initiator.

In some embodiments, ownership certificate generation unit 610 is further configured to generate the ownership certificate by sequentially pushing the validation information associated with the receiver of the transfer in the previous transfer record, a signature validation instruction, a public key of the initiator of the transfer, and a signature obtained by encryption with a private key of the initiator of the transfer into a stack. In some embodiments, the ownership certificate is used to validate an executable script of the new transfer record.

In some embodiments, transfer record generation unit 620 is further configured to generate a hash value of a previous transfer record of the to-be-transferred data in the blockchain; and store the hash value in the new transfer record.

In some embodiments, transfer record generation unit 620 is further configured to store the metadata or a reference to the metadata in the new transfer record.

In some embodiments, data transfer unit 630 is further configured to store the new transfer record in the blockchain in response to that the new transfer record passes validation of the blockchain system.

In some embodiments, the metadata is a unique identifier of a hash value based on the to-be-transferred data.

Figure 7:
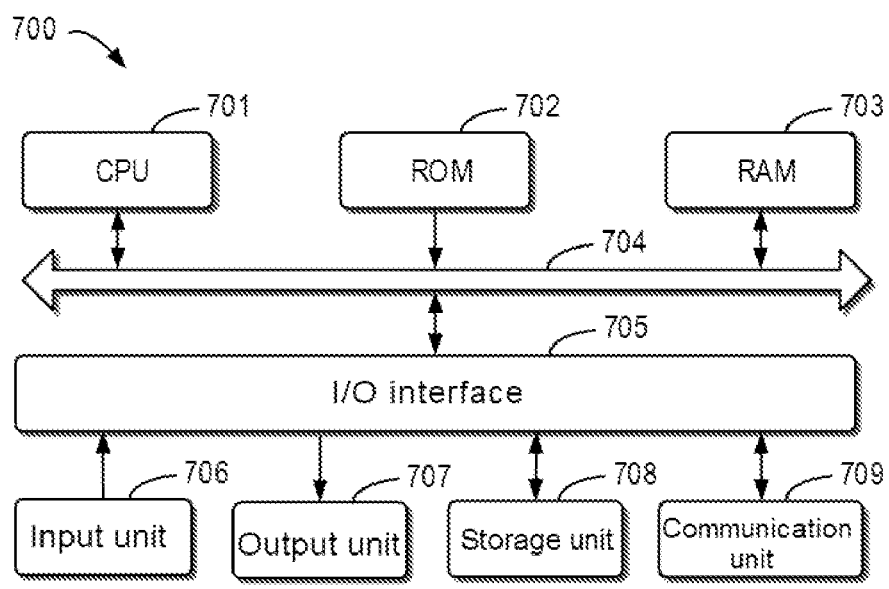
FIG. 7 is a schematic block diagram of an exemplary device that may be used to implement some embodiments according to the present disclosure.

FIG. 7 is a schematic block diagram of exemplary device 700 that may be used to implement some embodiments according to the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, such as method 400, may be performed by processing unit 701. For example, in some embodiments, method 400 may be implemented as a computer software program that is tangibly included in a machine-readable medium such as storage unit 708. In some embodiments, part or all of the computer program may be loaded and/or installed onto device 700 via ROM 702 and/or communication unit 709. One or more actions of method 400 described above may be performed when the computer program is loaded into RAM 703 and executed by CPU 701.

The present disclosure may be a method, an apparatus, a system, and/or a computer program product. The computer program product may include a computer-readable storage medium on which computer-readable program instructions for performing various aspects of the present disclosure are carried.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages, such as Smalltalk and C++, and conventional procedural programming languages, such as the C++ language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user's computer over any kind of networks, including a local area network (LAN) or a wide area network (WAN), or may be connected to an external computer (for example, connected through the Internet by using an Internet service provider). In some embodiments, an electronic circuit, for example, a programmable logic circuit, a field programmable gate array (FPGA), or a programmable logic array (PLA), is personalized by utilizing state information of the computer-readable program instructions, where the electronic circuit may execute computer-readable program instructions so as to implement various aspects of the present disclosure.

Various aspects of the present disclosure are described here with reference to the flow charts and/or block diagrams of the methods, the apparatuses (systems), and the computer program products according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or the another programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the accompanying drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for data transfer, comprising:
generating, based on metadata associated with data and a blockchain comprising a set of data transfer records, an ownership certificate of an initiator of a transfer of the data, wherein the ownership certificate is based on a current storage location of the data, the ownership certificate further comprising a public key of a storage apparatus comprising the data, the public key of the storage apparatus serving as an identifier of the storage apparatus and proving a permission of transferring the data from a first storage apparatus to a second storage apparatus;
generating a first transfer record for validation by a blockchain system, wherein the first transfer record comprises the ownership certificate and validation information associated with a receiver of the data; and
transferring the data to the receiver of the data in response to validating, by the blockchain system, the first transfer record.

2. The method according to claim 1, wherein generating the ownership certificate of the initiator of the transfer of the data comprises:
searching, using the metadata, for a second transfer record of the data on the blockchain; and
on a condition of an existence of the second transfer record, generating the ownership certificate based on validation information associated with a second initiator of a second transfer of the data in the second transfer record and signature information of the second initiator of the second transfer of the data in the second transfer record.

3. The method according to claim 2, wherein the validation information associated with the second initiator of the transfer of the data in the second transfer record comprises a hash value generated for the signature information by the second initiator of the transfer of the data.

4. The method according to claim 2, wherein generating the ownership certificate of the initiator of the transfer of the data further comprises:
on a condition of the existence of the second transfer record, generating the ownership certificate by sequentially pushing, onto a stack, the validation information associated with the second initiator of the second transfer of data in the second transfer record, a signature validation instruction, a public key of the second initiator of the second transfer of data in the second transfer record, and a signature obtained by encryption with a private key of the second initiator of the second transfer of data in the second transfer record.

5. The method according to claim 1, wherein the ownership certificate is used to validate an executable script of the first transfer record.

6. The method according to claim 1, wherein generating the first transfer record comprises:
generating a hash value of a second transfer record of the data in the blockchain; and
storing the hash value in the first transfer record.

7. The method according to claim 1, wherein generating the first transfer record further comprises:
storing at least one of the metadata or a reference to the metadata in the first transfer record.

8. The method according to claim 1, further comprising:
storing the first transfer record in the blockchain in response to validating, by the blockchain system, the first transfer record.

9. The method according to claim 1, wherein the metadata is a unique identifier of a hash value based on the data.

10. An apparatus for data transfer, comprising:
an ownership certificate generation unit configured to generate, based on metadata associated with data and a blockchain comprising a set of data transfer records, an ownership certificate of an initiator of a transfer of the data, wherein the ownership certificate is based on a current storage location of the data, the ownership certificate further comprising a public key of a storage apparatus comprising the data, the public key of the storage apparatus serving as an identifier of the storage apparatus and proving a permission of transferring the data from a first storage apparatus to a second storage apparatus;

a transfer record generation unit configured to generate a first transfer record for validation by a blockchain system, wherein the first transfer record comprises the ownership certificate and validation information associated with a receiver of the data; and a data transfer unit configured to transfer the data to the receiver of the data in response to validating, by the blockchain system, the first transfer record.

11. The apparatus according to claim 10, wherein the ownership certificate generation unit is further configured to:
search, using the metadata, for a second transfer record of the data on the blockchain; and
on a condition of an existence of the second transfer record, generate the ownership certificate based on validation information associated with a second initiator of a second transfer of the data in the second transfer record and signature information of the second initiator of the second transfer of the data in the second transfer record.

12. The apparatus according to claim 11, wherein the validation information associated with the second initiator of the transfer of the data in the second transfer record comprises a hash value generated for the signature information by the second initiator of the transfer of the data.

13. The apparatus according to claim 11, wherein the ownership certificate generation unit is further configured to:
on a condition of the existence of the second transfer record, generate the ownership certificate by sequentially pushing, onto a stack, the validation information associated with the second initiator of the second transfer of data in the second transfer record, a signature validation instruction, a public key of the second initiator of the second transfer of data in the second transfer record, and a signature obtained by encryption with a private key of the second initiator of the second transfer of data in the second transfer record.

14. The apparatus according to claim 11, wherein the ownership certificate is used to validate an executable script of the first transfer record.

15. The apparatus according to claim 10, wherein the transfer record generation unit is further configured to:
generate a hash value of a second transfer record of the data in the blockchain; and
store the hash value in the first transfer record.

16. The apparatus according to claim 10, wherein the transfer record generation unit is further configured to:
Store at least one of the metadata or a reference to the metadata in the first transfer record.

17. The apparatus according to claim 10, wherein the transfer record generation unit is further configured to:
store the first transfer record in the blockchain in response to validating, by the blockchain system, the first transfer record.

18. The apparatus according to claim 10, wherein the metadata is a unique identifier of a hash value based on the data.

19. A non-transitory computer-readable medium having instructions stored therein, which when executed by a processor, cause the processor to perform operations comprising:
generating, based on metadata of associated with data and a blockchain comprising a set of data transfer records, an ownership certificate of an initiator of a transfer of the data, wherein the ownership certificate is based on a current storage location of the data, the ownership certificate further comprising a public key of a storage apparatus comprising the data, the public key of the storage apparatus serving as an identifier of the storage apparatus and proving a permission of transferring the data from a first storage apparatus to a second storage apparatus;
generating a first transfer record for validation by a blockchain system, wherein the first transfer record comprises the ownership certificate and validation information associated with a receiver of the data; and
transferring the data to the receiver of the data in response to validating, by the blockchain system, the first transfer record.

20. The non-transitory computer-readable medium of claim 19, wherein generating the ownership certificate of the initiator of the transfer of the data comprises:
searching, using the metadata, for a second transfer record of the data on the blockchain; and
on a condition of an existence of the second transfer record, generating the ownership certificate based on validation information associated with a second initiator of a second transfer of the data in the second transfer record and signature information of the second initiator of the second transfer of the data in the second transfer record.

* * * * *